July 24, 1923.
D. W. JEFFRIES
1,462,506
COMBINED RAIL JOINT AND NUT LOCK
Filed Aug. 2, 1922
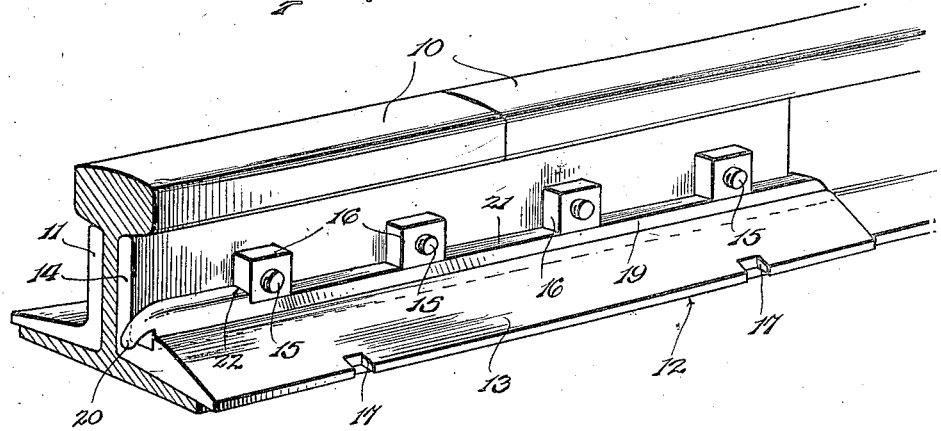
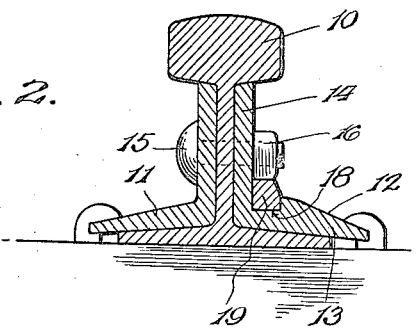
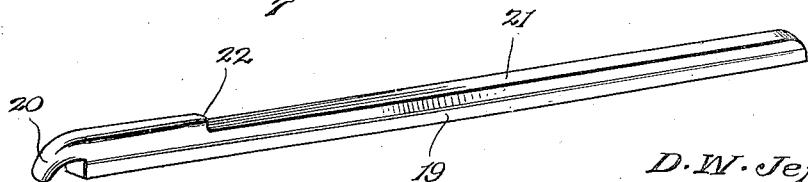
Inventor
D. W. Jeffries.
By Lacey & Lacey, Attorneys Patented July 24, 1923.

1,462,506

UNITED STATES PATENT OFFICE.

DUDLY W. JEFFRIES, OF SPRINGFIELD, MISSOURI.

COMBINED RAIL JOINT AND NUT LOCK.

Application filed August 2, 1922. Serial No. 579,157.

*To all whom it may concern:*

Be it known that I, DUDLY W. JEFFRIES, citizen of the United States, residing at Springfield, in the county of Greene and State of Missouri, have invented certain new and useful Improvements in Combined Rail Joints and Nut Locks, of which the following is a specification.

This invention relates to a combined rail joint and nut lock and seeks, as one of its principal objects, to provide a construction wherein all of the nuts of the several bolts of the joint may be locked by a single locking element.

The invention has as a further object to provide a device embodying a channeled fish plate and a locking bar slidably fitting in the channel of said plate and wherein, after the nuts of the several bolts of the rail joint have been applied, the bar may be shifted into position within said channel locking said nuts against counter-rotation.

And the invention has as a still further object, to provide a device which may be readily employed in connection with conventional rails and bolts.

Other and incidental objects will appear hereinafter.

In the drawings:

Figure 1 is a perspective view of the combined rail joint and nut lock of the present invention, Figure 2 is a transverse sectional view particularly illustrating the mounting of the locking bar of the device, and Figure 3 is a perspective view showing the locking bar in detail.

Referring now more particularly to the drawings, I have illustrated the meeting ends of conventional rails at 10. Overlying the joint at one side is a fish plate 11 which may be of any approved design and overlying the joint at its opposite side is a fish plate 12. As shown in Figures 1 and 2, this fish plate is provided with a bottom flange 13 resting flat against the base flanges of the rails overhanging the latter flanges. Rising from the flange 13 is a side flange 14 lying flat against the rail webs. Extending through the side flange of the fish plate 11, through the rail webs, and through the flange 14 of the fish plate 12, are the customary bolts 15 having securing nuts 16 thereon resting against the flange 14 and adjustable for clamping the fish plates against the rail webs. Formed in the overhanging edge of the bottom flange 13 are suitable notches 17 to receive the customary spikes, the fish plate 11 being similarly secured by spikes in the ordinary way. As shown in Figure 2, the bottom flange 13 of the fish plate 12 is thickened toward the side flange 14 thereof to provide a longitudinally disposed channel 18 extending from end to end of the bottom flange at the base of the side flange and slidably mounted in said channel is a locking bar 19 upstanding from the bottom flange. Formed on the bar at one end is a downwardly curved finger lug 20 and, as will now be observed, the bar is cut away at its upper edge to define a flat locking face 21 at the inner end of which is a stop shoulder 22.

In use, the fish plates 11 and 12 are applied to the rail ends and secured by the bolts 15, the nuts 16 of said bolts being tightened and adjusted to dispose the bottom edges thereof in alinement. The locking bar 19 is then inserted in the channel 18 of the fish plate 12 and shifted endwise within said channel until the stop shoulder 22 of the bar abuts the adjacent one of the nuts 16, the bar being thus retained upon the base flange 13 of the fish plate extending from end to end of said channel. In this position of the bar, the finger lug 20 thereof will overhang the fish plate at its adjacent end, as shown in Figure 1, so that said lug may be readily grasped for withdrawing the bar and attention is now directed to the fact that the bar is formed to snugly fit beneath the nuts 16 so that the face 21 of the bar will thus lie flat against the bottom edges of the nuts. Accordingly, the bar will serve to effectually lock all of said nuts against retrograde movement. At the same time, loosening of the nuts through vibration will be positively prevented while, when desired, the locking bar may be readily withdrawn so that the nuts may be removed and the bolts of the joint diplaced.

Having thus described the invention, what is claimed as new is:

In a combined rail joint and nut lock, the combination of companion fish plates, rail securing bolts extending through said plates, nuts adjustable upon said bolts, one of the plates being provided with bottom and side flanges and having its bottom flange thickened toward the side flange thereof and formed at the base of said side flange with a longitudinally directed channel, and a locking bar slidably received in said channel and cut away longitudinally throughout the major portion of its length to define a flat locking face engaging said nuts locking the nuts against rotation as well as to define a vertical stop shoulder at one end of said face abutting one of said nuts and limiting the bar against forward endwise movement lying substantially flush at its ends with said plate, the bar being provided at its shouldered end with a downturned handle overhanging the adjacent end of said plate.

In testimony whereof I affix my signature.

DUDLY W. JEFFRIES. [L. S.]